Oct. 11, 1966 KO-HSIN LIU 3,278,854
FREQUENCY SELECTIVE AMPLIFIER WITH A RESONANT TYPE NETWORK IN A FEEDBACK LOOP
Filed Aug. 8, 1963
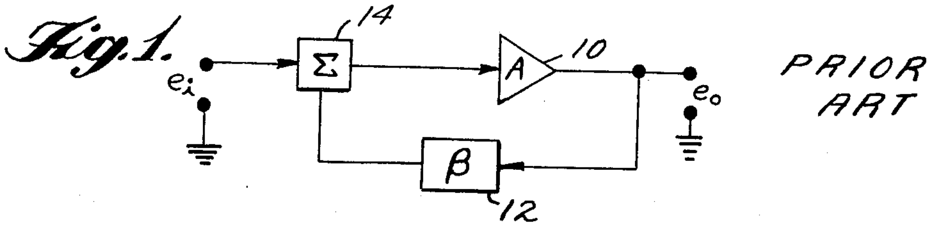
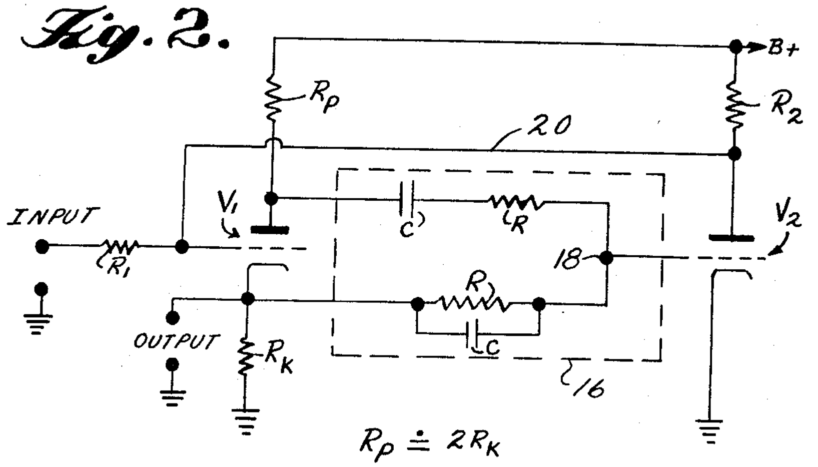
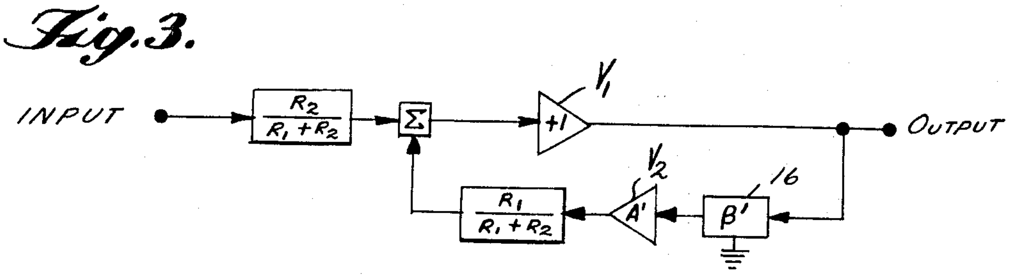
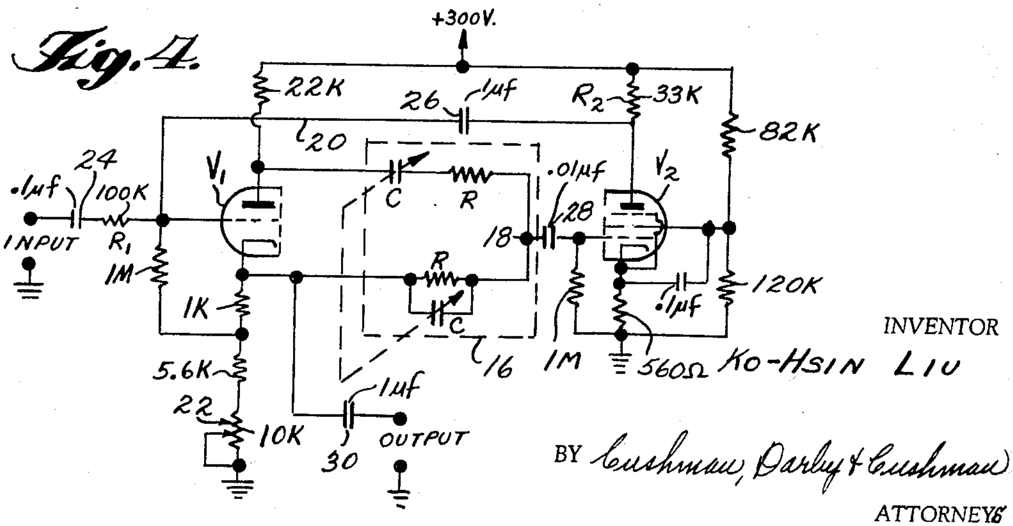
INVENTOR
KO-HSIN LIU
BY Cushman, Darby & Cushman
ATTORNEYS 3,278,854

FREQUENCY SELECTIVE AMPLIFIER WITH A RESONANT TYPE NETWORK IN A FEEDBACK LOOP

Ko-Hsin Liu, Hilliard, Ohio, assignor to Industrial Nucleonics Corporation, a corporation of Ohio Filed Aug. 8, 1963, Ser. No. 300,772
8 Claims. (Cl. 330—85)

This invention relates to amplifiers, and, more particularly, to frequency-selective amplifiers and the like.

This invention is also disclosed in my article which appeared in "Electronic Design," Aug. 16, 1962, at p. 68, and the contents thereof are hereby incorporated herein by reference.

Generally, frequency-selective amplifiers comprise either (1) a negative feedback amplifier having a null network in the feedback loop (for example, as disclosed in "Vacuum Tube Amplifiers," Valley and Wallman, Rad. Lab. Series, vol. 18, Chap. 10, Low-Frequency Feedback Amplifiers, McGraw-Hill), or (2) a positive feedback amplifier having a resonance-type network in the feedback loop (for example, as in the Pan Patent No. 2,675,432). In the first case, at the center frequency there is no negative feedback since the gain is then the same as the gain without feedback. In the second case, at the center frequency, the positive feedback from the output boosts the gain. In either case, the overall gain is subject to changes due to the amplifier forward path gain change which, in turn, is subject to change due to supply voltage variations, tube aging, tube replacement, and the like.

The present invention has as its main object the provision of an improved frequency-selective amplifier which is not subject to the aforesaid disadvantage, but which provides for a stable amplifier gain.

It is another object of this invention, in conjunction with the preceding object, to provide such an amplifier which, in one embodiment, includes a forward path amplifier operating essentially as a follower, for example, a cathode follower, with a stable unity gain and working into a frequency null network, with the output of the network feeding into a high gain amplifier which together attenuate the null frequency but pass all signals of unwanted frequencies back to the input of the forward path amplifier.

It is a further object of this invention to provide a variable frequency-selective amplifier as in the preceding object, in which the frequency null network is of the Wien bridge type.

Other objects and advantages of this invention will become apparent to those of ordinary skill in the art upon reading the appended claims and the following detailed description of the invention, in conjunction with the drawings, in which:

FIGURE 1 is a schematic diagram of a prior art frequency-selective amplifier;

FIGURE 2 is a simplified circuit diagram of the frequency-selective amplifier of this invention;

FIGURE 3 is a flow diagram for the amplifier of FIGURE 2; and

FIGURE 4 illustrates a detailed schematic version of this invention.

There are many situations in which it is desirable, if not absolutely necessary, to have a frequency-selective filter or amplifier with a stable gain at the selected frequency. In many cases, it is preferable that the filter or amplifier be variable in the frequency which it will select and separate from unwanted signal components. This invention provides for such a variable frequency-selective amplifier that has stable gain at the frequency to which it is adjusted. As has been indicated, conventional frequency-selective feedback amplifiers of the negative feedback type, which have a rejection filter in the feedback loop, have the disadvantage that the gain of the amplifier at center frequency is equal to the forward path gain which is undesirably subject to changes due to filament, power supply voltage, and tube parameters. Such a conventional amplifier is diagrammatically shown in FIGURE 1 wherein the forward path gain is due to the gain A of amplifier 10 and the negative feedback loop contains a frequency rejection network 12, which has a transfer function beta designated $\beta$. Adder 14 combines the external signal input $e_i$ with the output of network 12 to obtain via amplifier 10 the output $e_o$. The over-all gain of the amplifier circuit at the desired center frequency is substantially equal to the gain A of amplifier 10, since at that time $\beta$ is effectively equal to zero. At frequencies far from the center frequency, the over-all gain is approximately $1/\beta$. It is apparent then that the over-all gain at the center frequency depends on the gain of amplifier 10, meaning that circuit variations and the like undesirably figure in the over-all center frequency gain. This does not provide for a stable frequency-selective amplifier gain as does the present invention illustrated in FIGURES 2, 3 and 4.

In the simplified circuit diagram of FIGURE 2, the plates of vacuum tubes $V_1$ and $V_2$ are connected to B+ via respective plate resistors $R_p$ and $R_2$, while the cathode of tube $V_2$ is connected directly to ground and that of tube $V_1$ to ground through a resistor $R_k$, which is preferably approximately equal to one-half the resistance value of plate resistor $R_p$. The signals to be filtered and amplified by the circuit of FIGURE 2 are applied from the input to the grid of tube $V_1$ via resistor $R_1$, and the output of the circuit is taken from the cathode of tube $V_1$, across resistor $R_k$. Tube $V_1$ is bridged by a frequency rejection network 16, which, in turn, is connected at its mid-junction 18 to the grid of tube $V_2$, the plate of which is returned to the grid of tube $V_1$ by line 20.

As illustrated, the frequency determining network 16 of FIGURE 2 includes a serial resistance capacitance (RC) combination which is connected between the plate of tube $V_1$ and the grid of tube $V_2$. The other branch of network 16 includes a parallel RC combination which couples the cathode of tube $V_1$ to the grid of $V_2$. It will be recognized by those familiar with RC frequency selection circuits that network 16 comprises the frequency selective arms of a Wien bridge circuit. In other words, the frequency rejection or null network 16 is of the Wien bridge type.

By virtue of connection of network 16 in FIGURE 2 at its opposite end terminals respectively to the plate and cathode of tube $V_1$, the latter may be referred to as a split-load phase inverter which drives the frequency determining network 16. Network 16 attenuates the center or null frequency, but passes all signals of higher and lower frequency to the grid of tube $V_2$. Tube $V_2$ highly amplifies all off-null frequency signals and transmits the amplified signals via line 20 back to the grid of tube $V_1$. It is apparent that tube $V_1$ is operated essentially as a cathode follower, so that the output across its cathode resistor $R_k$ is substantially that which its grid receives, though the gain of tube $V_1$ is degenerative at its center frequency.

The flow diagram of FIGURE 3 satisfies the FIGURE 2 circuit and readily indicates that the over-all amplifier gain at center frequency is as follows:

$$G=\frac{R_2}{R_1+R_2}\times\frac{1}{1-A'\beta'\frac{R_1}{R_1+R_2}}=\frac{R_2}{R_1+R_2}$$

while the gain at frequencies far from the center frequency is $$G=\frac{R_2}{R_1+R_2}\times\frac{1}{1-A'\frac{R_1}{R_1+R_2}}=\frac{R_2}{R_1(1-A')+R_2}$$

where A' is the gain of the feedback signal amplifier $V_2$ and $\beta'$ is the transfer function of the feedback network 16. In FIGURE 3, it is indicated that amplifier $V_1$ has a unity gain, and it should be apparent from the foregoing that this amplifier tube in its operation as a cathode follower has a stable gain of approximately one.

From the foregoing it is also apparent that the over-all gain of the circuit of FIGURE 2 is relatively stable at the center frequency selected by circuit 16, because at the center frequency the gain is degenerative and independent of the gain of tube $V_2$, so that it is almost, if not fully, independent of supply voltage variations, and tube ageing or replacement. Another advantage of this invention is that the center frequency may be changed by the factor of $$\frac{1}{2\pi RC}$$

by simultaneous variation in both capacitors C of network 16, or simultaneous variation of both resistors R therein. Furthermore, since control of the center frequency can be so accomplished, there may be used, instead, other types of frequency rejection networks such as the twin-T network or parallel-T RC circuits as well as a bridged-T network or the like.

FIGURE 4 shows an example of a detailed, practical Wien bridge frequency-selective amplifier constructed in accordance with this invention and using a triode-pentode tube for example, such as a 6EA8 type. The component values indicated in the figure are exemplary and limitation thereto is not intended. It will be noted that in the cathode circuit of tube $V_1$ there is a variable resistor 22, which may be used to improve the rejection signal and network 16. That is, in order to avoid unbalance of the bridge formed by the frequency rejection network 16 and tube $V_1$, a variable resistor 22 is employed. For the adjustment of this resistor, the feedback loop including line 20 is opened at a convenient point initially. Then, the resistances R or capacitors C in network 16 and potentiometer 22 are adjusted to the best null by applying a frequency signal at the input of the over-all circuit, which signal is detected by a CRO or VTVM at the plate of tube $V_2$.

Other refinements in FIGURE 4 include the addition of coupling and D.C. blocking condensers, such as condenser 24 in the input circuit in series with resistor $R_1$, condenser 26 in series with the feedback line 20, condenser 28 between junction 18 and the grid of $V_2$, and condenser 30 in the output line. The operation of the circuitry in FIGURE 4 is similar to that already described relative to FIGURES 2 and 3, and further description thereof is believed unnecessary, it being apparent that tube $V_1$ is operated and used as a stable degenerative amplifier in the forward path of the circuit, with the frequency rejection network 16 and tube $V_2$ being in series in the feedback loop to achieve a stable frequency selective amplification.

Test results on the circuitry of FIGURE 4 indicate that the gain stability of the circuit at the center frequency is very good despite large changes in the power supply voltage or filament as well as change of tubes. With the parameters indicated in FIGURE 4, the circuitry can be operated up to about 500 kc.

It is, therefore, apparent that this invention provides apparatus which accomplishes the objects and has the advantages herein mentioned. Other objects and advantages of this invention, and even modifications thereof, will become apparent to those of ordinary skill in the art upon reading this disclosure, but it is to be understood that this disclosure is intended to be illustrative and not limitative, the scope of the invention being defined by the appended claims.

What is claimed is:

1. An amplifier circuit for rejecting and selecting certain frequencies comprising:
- an input resistor $R_1$ for receiving signals applied to said amplifier circuit,
- a stable degenerative amplifier for selecting a desired frequency, connected at its input to said resistor, providing a forward path in said circuit and having a cathode-follower type output acting as the output of said amplifier circuit, and
- a feedback loop from said output to said input of said amplifier including
- a frequency determining network connected across said amplifier, and
- a signal amplifier fed by said network and having a load resistor $R_2$ connected to the input of said degenerative amplifier to cause the gain of said amplifier circuit to be substantially independent of the gain of said signal amplifier at said desired frequency but dependent on the value of $$\frac{R_2}{R_1+R_2}$$

2. An amplifier circuit as in claim 1 wherein said frequency determining network includes resistance and capacitance elements.

3. An amplifier circuit as in claim 2 wherein said frequency determining network includes two serially connected RC combinations the junction of which feeds said signal amplifier, one of said combinations being serial, the other parallel.

4. A frequency-selective amplifier circuit comprising:
- first and second vacuum tube means each having a plate, grid, and cathode,
- an input circuit including a first resistor $R_1$ connected to the grid of said first tube means,
- means including plate and cathode resistors for said first tube means for supplying operating potentials therefor,
- a frequency rejection network having a center frequency null characteristic and including a first RC combination coupled between the plate of said first tube means and the grid of the said second tube means and a second RC combination between that grid and the cathode of said first tube means,
- means coupled to the plate and cathode of said second tube means, and including a plate resistor $R_2$, for supplying operating potentials therefor,
- means coupling the plate of said second tube means back to the grid of said first tube means, and
- an output circuit coupled to the cathode of said first tube means,
- the gain of said amplifier circuit at said center frequency being approximately equal to $$\frac{R_2}{R_1+R_2}$$

and at frequencies far from said center frequency $$\frac{R_2}{R_1(1-A')+R_2}$$

wherein A′ is the gain of said second tube means.

5. An amplifier as in claim 4 wherein said first RC combination is serial and the second parallel.

6. An amplifier as in claim 4 wherein the said plate resistor for said first tube means has a resistance value of approximately twice that of its said cathode resistor.

7. An amplifier as in claim 4 wherein one of R and C in each said combination thereof is variable to change the said center frequency of said network.

8. An amplifier as in claim 4 wherein the said plate and cathode resistors for said first tube means includes a variable cathode resistance for preventing unbalance of said network.

References Cited by the Examiner

UNITED STATES PATENTS

| | | | |
|---|---|---|---|
| 2,372,419 | 3/1945 | Ford et al. | 330—85 X |
| 2,490,805 | 12/1949 | Hastings | 330—85 |
| 2,658,958 | 11/1953 | Wells | 330—109 |

OTHER REFERENCES

Radiotron Designer's Handbook, Langford-Smith, ed., RCA L34, 1956, pp. 316–319.

ROY LAKE, *Primary Examiner.*

R. P. KANANEN, J. B. MULLINS, *Assistant Examiners.*